UNITED STATES PATENT OFFICE.

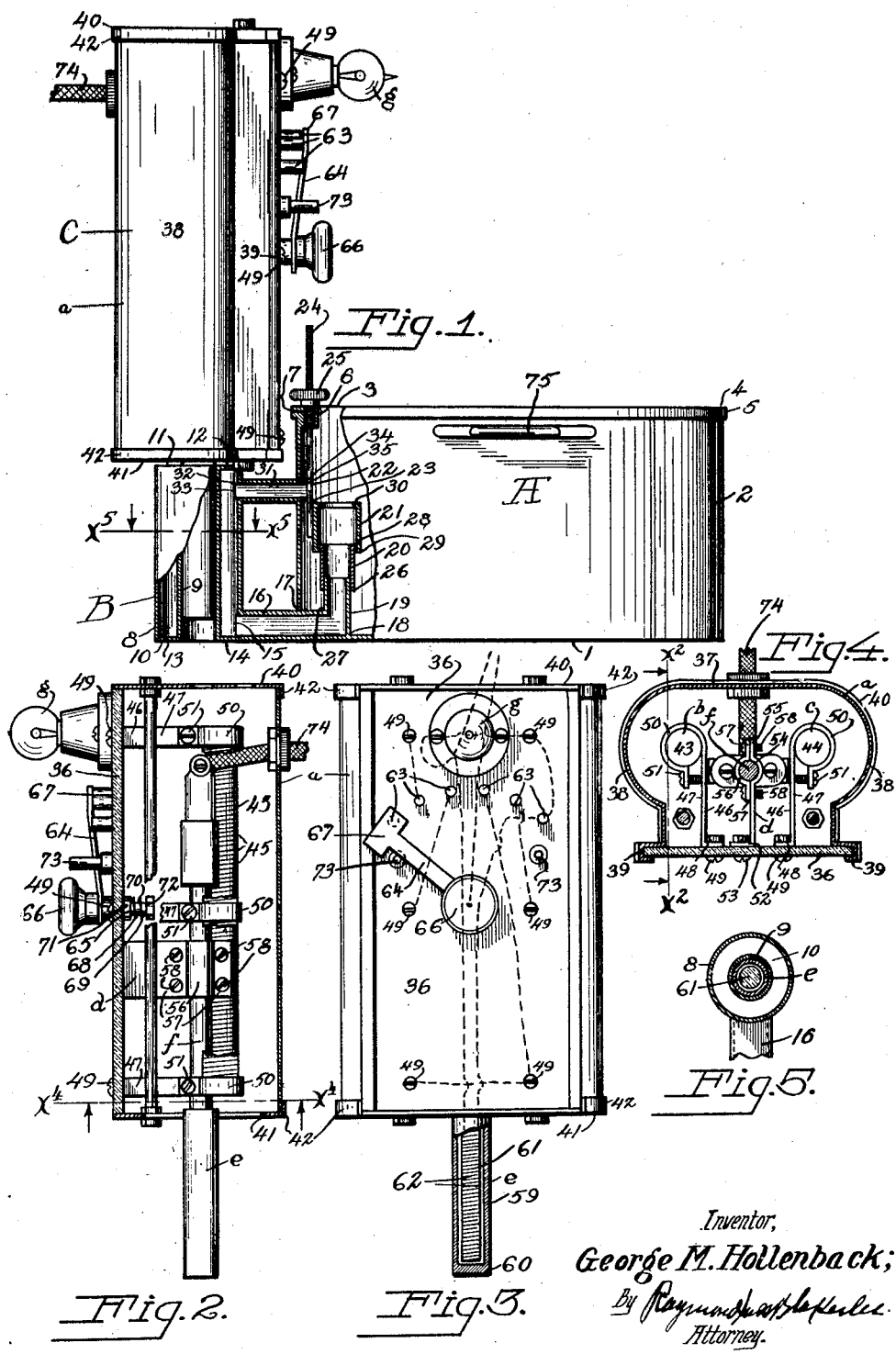

GEORGE M. HOLLENBACK, OF LOS ANGELES, CALIFORNIA.

FLUID HEATER.

1,408,198.     Specification of Letters Patent.    Patented Feb. 28, 1922.

Application filed May 5, 1920. Serial No. 379,070.

*To all whom it may concern:*

Be it known that I, GEORGE M. HOLLENBACK, a citizen of the United States, residing at Los Angeles, in the county of Los Angeles and State of California, have invented new and useful Improvements in Fluid Heaters, of which the following is a specification.

This invention relates to fluid heaters, and has for its object to provide a device of this character whereby different temperatures may be obtained at different depths of the fluid, and means for regulating the temperature at said depths.

Further objects of increased efficiency, inexpensiveness and the like will appear.

Particularly the invention has to do with a device for heating water to varying temperatures so that the water may be used for the softening of modeling or impression compounds such as are used in dentistry.

In practicing the invention there is provided a fluid container and means associated with said container whereby a fluid contained therein may be heated to any desired temperature at any desired level of the fluid, when a suitable heating element is removably placed in the means associated with said container.

The invention further consists in the particular combination, inter-relation, construction, association and relative arrangement of the several parts, elements and features of the fluid heater as illustrated in the drawing, described in the specification, and finally pointed out in claims.

In the drawing:

Figure 1 is a fragmentary side elevation, certain parts being shown sectioned, of a fluid heater, and component elements for heating the fluid;

Figure 2 is a cross sectional side elevation of means used in heating fluid, taken on the line $x^2$—$x^2$, Figure 4;

Figure 3 is a front elevation of the device shown in Figure 2, with the heating element shown in cross section;

Figure 4 is a fragmentary cross sectional end elevation of the device shown in Figure 2, and taken on the line $x^4$—$x^4$, Figure 2;

Figure 5 is a fragmentary cross sectional plan of a certain element used in connection with the fluid, and taken on the line $x^5$—$x^5$, Figure 1.

Corresponding parts in all the figures are designated by the same reference characters.

Referring to the drawing, A designates a fluid container, B, water jacket means associated with said fluid container and located on the exterior thereof, and C designates means for supplying and regulating a source of heat,—all of which elements are used in practicing one embodiment of my invention.

The container A comprises a suitable vessel having a bottom member 1, and angularly disposed side members 2, and said container is open at the top as at 3. The container is also provided at the periphery thereof as at 4 with a rim 5, which rim is enlarged as at 6. The enlarged portion 6 has a perforation 7 extending therethrough.

The means B associated with the container A comprises an outer tubular member 8 and an inner tubular member 9 arranged in spaced relation to said outer member 8. The tubular member 8 is closed at the bottom as at 10 and the tubular members 9 and 8 have their top extremities as at 11 and 12, as well as their bottom extremities 13 and 14 integrally formed. A port 15 is provided at the lower portion of the means B, which port has a tubular member 16 communicating with the interior portion of the chamber formed by the union of the tubular members 8 and 9, and which tubular member 16 likewise passes through a perforation or opening 17 into the container A. An end portion of the tubular portion 16 shown at 18 has an angularly disposed extremity 19 and which extremity is encased by further tubular members 20 and 21 which are capable of telescoping action in relation to each other. A rod 22 is fastened as at 23 to a portion of the outer surface of the member 21, and an upper portion of the rod 22 as at 24 is threaded, which threaded portion is accommodated in the portion 7 of the enlarged portion 6. A nut 25 screws upon the threaded portion 24 and by turning the nut 25 to the right or to the left, the rod 22 will be raised or lowered, and this raising or lowering will cause the telescopic portions 20 and 21 to be lowered on the part 19 and when the lower portion 26 of the member 20 hits the tube 16 as at 27, the member 21 will start to telescope the member 20. The telescoping action of the members 20 and 21 is limited by the lengths of said members. In order to prevent the members 20 and 21 from becoming disassociated from each other a flange portion 28 is provided at one end of the member 20 and an inwardly directed end portion 29 is provided on the member 21. The flanged portion 28 and the inwardly directed portion 29 may co-act with each other as shown in Figure 1. The member 21 is likewise provided at its opposite end with an inwardly directed portion 30. The angularly directed portion 19 of the tube 16, which angularly directed portion is contained within the container A, is not shown in the drawing as provided at its upper end with a flange. But obviously a flanged portion might be provided for the members 19 and 20. A tube 31 joins an upper portion of the means B and the container A. The tube 31 communicates at one end with a port 32 located at 33 in the means B, and its opposite end as at 34 communicates with a port 35 in the container A.

The means for supplying and regulating the source of heat includes a housing $a$ provided with a facing or front member 36. The cover and side walls are formed integrally as shown in Figure 4. A top portion of the housing $a$ as 37 is practically flat, while its side members as 38 are arcuate or in convex form for a portion; below that at each side is a portion in the form of an inwardly directed U 39 used to clamp the cover and side members to the member 36. End members 40 and 41 of the housing $a$ have their edges flanged as at 42 for a portion in order to grip the end portions of the sides and top.

Disposed within the housing $a$ are electrical resistance elements $b$ and $c$ which consist of insulating tubes 43 and 44 wound on the periphery thereof with resistance wire 45, the alternate turns of which wire are in spaced relation to each other. As shown, two of the electrical resistance elements are disposed within the housing, and they are likewise arranged in parallel relation to each other, although obviously this is not necessary. Each of the resistance elements $b$ and $c$ are held in position by supports or brackets 46 having leg portions 47 and foot portions 48, which foot portions are held to the member 36 by means of a bolt and screw 49 passing through perforations in the member 36 and in the foot portions 48. The leg portion 47 extends upwardly and is curved downwardly to form a clamping band 50 for each of the resistance elements $b$ and $c$. This clamping band may be regulated as to the amount of tension with which it grips the resistance elements by means of a screw 51 threaded into the leg 47. It will be observed by referring to the various figures that four of these brackets are provided, one for each end of the resistance elements $b$ and $c$.

Intermediately disposed between the brackets 46 is a split ring bracket $d$ provided with a foot portion 52 which is held in position to the member 36 by means of a screw 53 passing through a perforation in the member 36 and in the foot 52. An upper stretch of the split ring bracket $d$ has a concave portion 54 and a straight portion 55. A half ring 56 provided with lugs 57 is detachably attached to the split ring bracket $d$ adjacent the concave portion 54, by means of screws 58 passing through perforations in the lugs 57 and into threaded perforations in the split ring bracket $d$. An electrical heating element $e$ provided with a supporting arm $f$ is held within the split ring portion of the split ring bracket $d$. The electrical heating element $e$ as well as its arm $f$ extend longitudinally of the housing $a$, and the electrical heating element $e$ is located on the exterior of the housing $a$ projecting through a perforation located in the end member 41. The electrical heating element $e$ includes a tubular housing 59 closed at one end as at 60, and within the housing 59 is contained an insulating refractory rod 61 having resistance wire 62 wound on the peripheral surface of the same. The member 36 acts as the instrument board for regulating the heat content or heat-giving power of the means $e$. The face of the member 36 has mounted thereon a plurality of switch points 63 arranged in semi-circular formation and over the switch points plays a switch 64. The switch 64 is rotatably mounted on the member 36 as at 65. The switch 64 is provided as at 66 with a knob for facilitating the ready turning of same. To at all times ensure that the end portion 67 of the switch will contact with the heads of the switch points 63 the knob 66 is provided with a shank 68 passing through a perforation located within the member 36, and the shank is surrounded as at 69 on the interior of the housing $a$ with a spring 70 which bears against a loose ring 71 fitting against the interior face of the member 36 and against a nut 72 fixedly joined to the end of the shank 68. To limit the rotation of the switch 64 stops 73 are provided, which stops extend outwardly from the member 36 as illustrated in the figures. A pilot light $g$ is provided near the uppermost portion of the housing $a$ and on the member 36. This light is simply to indicate when the heating element is in operation. The circuits and various connections for the heating element $e$, the switch 64 and the contact points 63 as well as the resistance elements 62, are shown in Figure 3 in diagrammatic form and a description of same is unnecessary, as it is standard practice. A cord 74 leads from the interior of the housing to a source of current supply. Obviously when the switch 64 plays over the contact points 63 less and less resistance is used and consequently the heat given off by the heating element $e$ will be increased or decreased.

The heating element $e$ is normally removably placed within the interior of the tubular member 9. When the heating element $e$ becomes hot the heat is communicated through the walls 61 and through the walls of the tubular member 9 to any fluid contained within the space between the members 8 and 9.

In order to facilitate a ready handling or carrying of the container A, outwardly depending handles 75 are provided.

In practicing the invention, its chief utility is for softening a modeling or impression compound such as would be used in dentistry. Impression compounds are made of wax composition and disintegrate readily under the influence of heat. With this invention the impression compound would be placed in the bottom of the container A and a fluid such as water pored over same until the container was full or nearly full. Obviously any impression compound would work most easily when it was heated, as the mass would be more plastic at that time. Consequently by utilizing the specific structure shown in the drawing and placing a water jacket or waterback on the exterior of the container A with suitable tubular members communicating with the interior of both the water jacket or waterback and the container A, a heating of the water jacket or waterback would cause the water to flow through the lower tubular member and out through the upper tubular member by a process of convection. The continuous circulation of the fluid would cause the fluid to become heated and the warm water to rise to the upper connection of the water jacket or waterback and flow within the interior of the container A and at the top thereof, while to take the place formerly occupied by the particles, colder particles flow from the bottom of the container through the lower connection to the waterback, and thus complete the circuit, which motion is continued as long as there is any difference in the temperature of the water in the container and the pipes and the external atmosphere surrounding them.

If it were assumed that water had various strata a rising of the lower part of the lower connection communicating with the container A and the waterback would cause different strata of the water to flow through the port within the container. This port would act as a port of ingress to the waterback, while the upper connection communicating with the container and the waterback would act as a means of egress of the water from the waterback to the container A. Any fluid content below the port of ingress would remain undisturbed and practically of the same temperature as the original fluid poured into the container, while a stratum of fluid or a level of fluid located above the port of ingress would tend to flow within said port through the lower connection into the waterback and out through the upper connection into the container A, and thus as previously described the fluid located in the upper portion of the container A would be much warmer than the fluid located in the bottom of the container. Consequently, by providing suitable means such as concentric telescoping tubes telescoping the angularly disposed extremity 19, it is possible to regulate which stratum or which level of any fluid within the container A, which will pass through the lower connection and into the waterback or water jacket. Now, if the heat given forth by the heating element e is regulated by means of the switch 64 playing over certain of the switch points 63, it will be possible to regulate the given temperature of any level of the fluid contained within the container A. Thus a plastic mass which it is desired to work may be raised to such a height within the fluid to a point where the water has a sufficient heat content to allow same to be readily molded into any form desired. That portion of the impression or modeling compound not desired may be dropped back upon the bottom of the container A and into the colder regions of the fluid.

At the present time so far as is known, no apparatus of a similar character for use in modeling compounds is used by manufacturing dentists and the expense of the modeling compound and the great waste that is incident to its disintegrating under the influence of heat will be readily overcome by utilizing an apparatus of this sort.

It is obvious that many changes and modifications may be made in practicing the invention as described in the specification and shown in the drawing, all of which may be made within the limits of the appended claims.

Having thus disclosed my invention, I claim and desire to secure by Letters Patent:

1. A fluid heater for softening a modeling or impression compound, comprising a fluid container member and means associated with said member whereby fluid contents therein may be heated to any desired temperature at any desired level of the fluid.

2. A fluid heater for softening a modeling or impression compound, comprising a fluid container member and means associated with said member whereby fluid contained therein may be variably heated so that different levels of the fluid may be regulated as to the temperature of same.

3. A fluid heater for softening a modeling or impression compound, comprising a fluid container provided with a port, means joined to said container and co-actively arranged with relation to said port, and a heating element associated with said means, whereby any fluid contained within the container will be moved through the port and heated.

4. A fluid heater for softening a modeling or impression compound, comprising a fluid container provided with ports, means joined to said container and co-actively arranged with relation to said ports, an adjustable heating element associated with said means whereby any fluid contained within the container will be drawn through one of said ports and passed back through the other of said ports and heated while in motion.

5. A fluid heater for softening a modeling or impression compound, comprising a fluid container, means capable of holding the fluid and adjoining said container, tubular members communicating with the interior of the fluid container and said means, and a heating element associated with said means, whereby fluid contents of said container and means and tubular members will be caused to circulate through the same by convection and be heated while so circulating.

6. A fluid heater for softening a modeling or impression compound, comprising a fluid container, means capable of holding the fluid and adjoining said container, tubular members communicating with the interior of the fluid container and said means, and a heating element associated with said means, whereby fluid contents of said container and means and tubular members will be caused to circulate through the same by convection and be heated while so circulating; said means including a fluid jacket comprising two concentric tubular wall members having a sealed space between them.

7. A fluid heater for softening a modeling or impression compound, comprising a fluid container, a waterback joined to said container and on the exterior thereof, and a heating element associated with said waterback, so that a fluid contained within said waterback and container will circulate by convection and be heated while so circulating.

8. A fluid heater for softening a modeling or impression compound, comprising a fluid container, a fluid jacket joined to said container, said fluid jacket comprising two concentric tubular wall members having a sealed space between them, tubular members communicating with the interior of the fluid container and said fluid jacket, and a heating element associated with said fluid jacket, whereby fluid contained in said container and fluid jacket and tubular members will be caused to circulate through the same by convection and be heated while so circulating.

9. A fluid heater for softening a modeling or impression compound, comprising a fluid container, means capable of holding the fluid joined to said container, a tubular member communicating with the interior of the fluid container and with said means, and a heating element associated with said means, whereby any fluid contained in the means may be heated.

10. A fluid heater for softening a modeling or impression compound, comprising a fluid container, a fluid jacket joined to said container, said fluid jacket comprising two concentric tubular wall members having a sealed space between them, a lower tubular member communicating with the interior of said fluid jacket and near one end thereof, while its opposite end communicates with the interior of the container adjacent to the base thereof, and a tubular member joining a portion near the opposite end of said jacket and communicating with a port located near the rim of the container, said last named tubular member likewise communicating with the interior of the said jacket, and a heating element associated with said fluid jacket, whereby fluid contained in said container and fluid jacket and tubular members will be caused to circulate through the same by convection and be heated while so circulating.

11. A fluid heater for softening a modeling or impression compound, comprising a fluid container, a fluid jacket joined to said container, said fluid jacket comprising two concentric tubular wall members having a sealed space between them, a lower tubular member communicating with the interior of said fluid jacket and near one end thereof, while its opposite end communicates with the interior of the container adjacent to the base thereof, and a tubular member joining a portion near the opposite end of said jacket and communicating with a port located near the rim of the container, said last named tubular member likewise communicating with the interior of the said jacket, and a heating element associated with said fluid jacket, whereby fluid contained in said container and fluid jacket and tubular members will be caused to circulate through the same by convection and be heated while so circulating; said heating element being removably contained within the interior of said inner concentric wall member, and means for regulating the temperature of said heating element.

12. A fluid heater for softening a modeling or impression compound, comprising a fluid container, a fluid jacket joined to said container, said fluid jacket comprising two concentric tubular wall members having a sealed space between them, a lower tubular member communicating with the interior of said fluid jacket and near one end thereof, while its opposite end communicates with the interior of the container adjacent to the base thereof, and a tubular member joining a portion near the opposite end of said jacket and communicating with a port located near the rim of the container, said last named tubular member likewise communicating with the interior of the said jacket, and a heating element associated with said fluid jacket, whereby fluid contained in said container and fluid jacket and tubular members will be caused to circulate through the same by convection and be heated while so circulating; and the tubular member which communicates with the interior of the container adjacent the base thereof being provided with an angularly disposed extremity upwardly directed within the container.

13. A fluid heater for softening a modeling or impression compound, comprising a fluid container, a fluid jacket joined to said container, said fluid jacket comprising two concentric tubular wall members having a sealed space between them, a lower tubular member communicating with the interior of said fluid jacket and near one end thereof, while its opposite end communicates with the interior of the container adjacent to the base thereof, and a tubular member joining a portion near the opposite end of said jacket and communicating with a port located near the rim of the container, said last named tubular member likewise communicating with the interior of the said jacket, and a heating element associated with said fluid jacket, whereby fluid contained in said container and fluid jacket and tubular members will be caused to circulate through the same by convection and be heated while so circulating; and the tubular member which communicates with the interior of the container adjacent the base thereof being provided with an angularly disposed extremity upwardly directed within the container; and extensible means joined to said angularly disposed extremity.

14. A fluid heater for softening a modeling or impression compound, comprising a fluid container, a fluid jacket joined to said container, said fluid jacket comprising two concentric tubular wall members having a sealed space between them, a lower tubular member communicating with the interior of said fluid jacket and near one end thereof, while its opposite end communicates with the interior of the container adjacent to the base thereof, and a tubular member joining a portion near the opposite end of said jacket and communicating with a port located near the rim of the container, said last named tubular member likewise communicating with the interior of the said jacket, and a heating element associated with said fluid jacket, whereby fluid contained in said container and fluid jacket and tubular members will be caused to circulate through the same by convection and be heated while so circulating; and the tubular member which communicates with the interior of the container adjacent the base thereof being provided with an angularly disposed extremity upwardly directed within the container; extensible means joined to said angularly disposed extremity, said extensible means comprising a concentric tubular member telescoping said angularly disposed extremity, an end of which tubular member is open and acts as an ingress port for fluid held within the container.

15. A fluid heater for softening a modeling or impression compound, comprising a fluid container, a fluid jacket joined to said container, said fluid jacket comprising two concentric tubular wall members having a sealed space between them, a lower tubular member communicating with the interior of said fluid jacket and near one end thereof, while its opposite end communicates with the interior of the container adjacent to the base thereof, and a tubular member joining a portion near the opposite end of said jacket and communicating with a port located near the rim of the container, said last named tubular member likewise communicating with the interior of the said jacket, and a heating element associated with said fluid jacket, whereby fluid contained in said container and fluid jacket and tubular members will be caused to circulate through the same by convection and be heated while so circulating; and the tubular member which communicates with the interior of the container adjacent the base thereof being provided with an angularly disposed extremity upwardly directed within the container; extensible means joined to said angularly disposed extremity; said extensible means comprising a plurality of concentric tubular members, one of which telescopes said angularly disposed extremity, and the outer concentric tubular member of which is open at one end, which opening acts as an ingress port for any fluid held within the container, and means associated with one of said concentric telescoping tubular members whereby the tubular members may be raised or lowered, thus raising or lowering the ingress port for any fluid within the container.

In testimony whereof, I have signed my name to this specification in the presence of a subscribing witness.

GEORGE M. HOLLENBACK.

Witness:
  J. SHUTT.